June 1, 1965   K. B. PIERSON ET AL   3,186,682
BUTTERFLY VALVE DISC AND SHAFT SEALING STRUCTURE
Filed Nov. 12, 1963   2 Sheets-Sheet 1

INVENTORS:
KARL B. PIERSON
JOHN R. HANSON
BY
Meyer, Baldwin, Doran & Young
ATTORNEYS June 1, 1965  K. B. PIERSON ET AL  3,186,682
BUTTERFLY VALVE DISC AND SHAFT SEALING STRUCTURE
Filed Nov. 12, 1963  2 Sheets-Sheet 2

INVENTOR.
KARL B. PIERSON
JOHN R. HANSON
BY
Meyer, Baldwin, Doran & Egan
ATTORNEYS

United States Patent Office 3,186,682
Patented June 1, 1965

3,186,682
BUTTERFLY VALVE DISC AND SHAFT
SEALING STRUCTURE
Karl B. Pierson and John R. Hanson, Warren, Pa., assignors to Betts Machine Company, Warren, Pa., a corporation of Pennsylvania
Filed Nov. 12, 1963, Ser. No. 323,022
3 Claims. (Cl. 251—306)

This invention relates to a novel and improved valve structure, and is a continuation-in-part of our co-pending application, Serial No. 80,136, filed January 3, 1961, now abandoned, for Butterfly Valve. The invention relates more particularly to that type of butterfly valve provided with a rigid disc pivotable on a diametric axis. Our invention is applicable to wet or dry service, namely it is usable to permit or prevent the flow of fluids, whether liquid or gaseous and also to control flow of transmission of powders and slurries.

An object of the invention is to provide a butterfly valve of the character indicated which requires no stuffing box or other packing means to prevent leakage along the stem.

A further object of the invention is to provide a butterfly valve structure especially adapted for the prevention of endwise leakage along a shaft which is disposed to operate or position the rotatable butterfly disc characteristic of such valves.

A further object of the invention is to provide a valve of the type indicated in the last preceding paragraph which carries a bonded coating of a resilient material such as rubber, or a rubberlike compound, not only on its planar surfaces but also around its peripheral edge.

Another object of the invention is to provide a butterfly valve having manual control means with positive stops both at the fully-open and completely-sealing positions.

Other objects and advantages will be apparent from a study of the following description of one embodiment of the invention, in conjunction with the accompanying drawings, in which.

Figure 1:
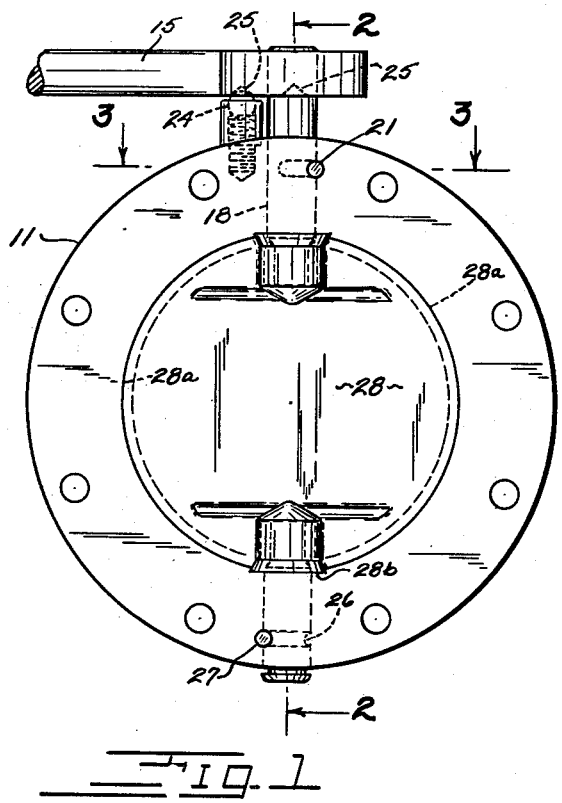
FIG. 1 is a front elevational view of a butterfly valve in closed position in a pipe fitting.
Figure 2:
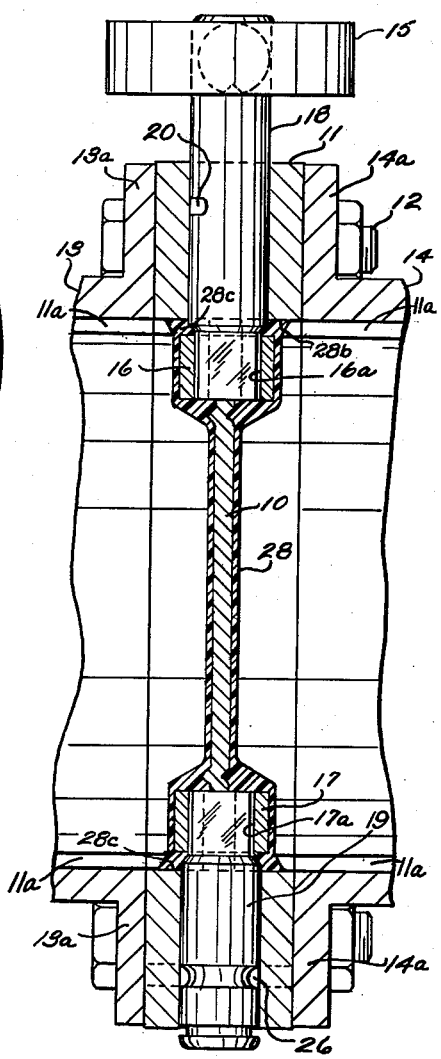
FIG. 2 is a vertical sectional view taken on the line 2—2 of FIG. 1.

Speaking first generally, with reference when necessary to FIGS. 1 and 2, we show a valve disc 10 within a collar or pipe fitting 11, which in turn is removably secured by bolts 12 which extend between and secure the flanges 13a and 14a of respective pipe ends 13 and 14. As will appear external manual valve-operating means, consisting of the lever 15, is used to swing the disc from the closed position shown in FIGS. 1, 2 and 6 to the fully opened position fragmentarily shown in FIG. 7 wherein the plane of the disc coincides with the longitudinal axis of the pipe.

At diametrically opposed zones on the axis of disc rotation the disc 10 is provided with bosses 16 and 17 in which apertures or sockets 16a and 17a of rectangular cross section are sunk to receive locating shafts 18 and 19 which also serve to journal the disc for rotation, and shaft 18 is of course rotated by lever 15 in the operation of the valve.

Figure 3:
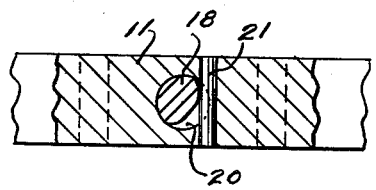
FIG. 3 is a sectional view somewhat enlarged, taken on the line 3—3 of FIG. 1.

Shaft 18 is provided with a groove 20 (FIGS. 2 and 3) which receives the mid-portion of a pin 21 which has a forced fit in the fitting 11. The groove is contoured to permit a ninety-degree (90°) rotation of shaft 18, and consequently a movement of the disc between fully-open and fully-closed positions.

Mounted on the outer periphery of fitting 11 in the present embodiment of the invention is a spring biased ball detent 24 which snaps into depressions 25 in the lever when at both ends of its arcuate travel to retain the lever until again manually moved, and to readily locate the open and closed positions of the valve disc.

The lower shaft 19 is likewise provided with a groove 26 to cooperate with a pin 27. In this instance the pin need not serve as a stop, but only as a retaining means to prevent stud 19 from dropping out of the fitting.

The disc 10 in the present embodiment of the invention is completely covered by a bonded coating 28 of resilient material which covers the outer planar or lateral faces of the disc and also the disc peripheral edge as indicated at 28a on FIG. 1. It will also be noted that the coating covers all exposed surfaces of the bosses 16 and 17 both externally and within the socket apertures so that, as shown at 28b in FIGS. 1, 2 and 4, the resilient material is in complete circumferential contact with its seat in fitting 11 when the valve is in closed position. It will be further noted that even when the valve is rotated to fully-open position, so that most of the disc periphery is cleared from the fitting, the portion at the bosses remains in sealing engagement with the fitting at 28b (FIG. 1) so as to seal against fluid escape along shafts 18 and 19, as will be more fully explained hereinbelow. If desired the disc need be only partially coated, but it is preferred that there be sufficient coating to provide peripheral sealing surfaces. The seal arises from the fact that the coated disc is slightly oversize with respect to the aperture in the fitting and said coated disc must be forced into operating position when assembling the valve.

Figure 5:
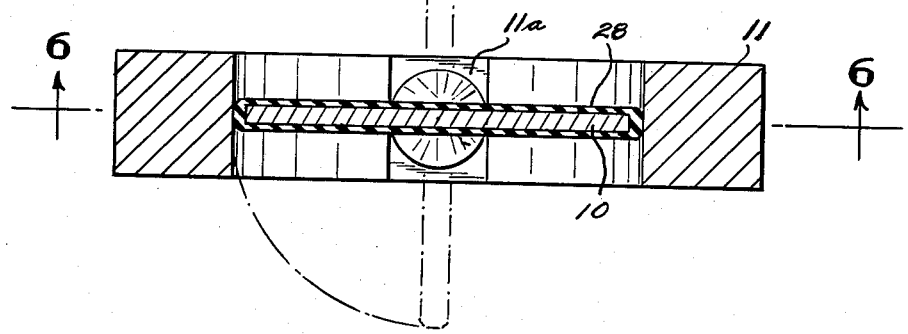
FIG. 5 is a sectional view, slightly enlarged, as seen from the position of the line 5—5 on FIG. 1, but with the strengthening ribs omitted.
Figure 6:
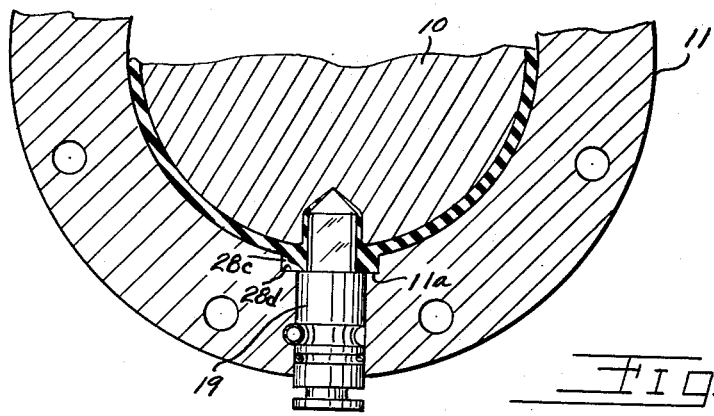
FIG. 6 is a fragmentary sectional view taken on the line 6—6 of FIG. 5.
Figure 7:
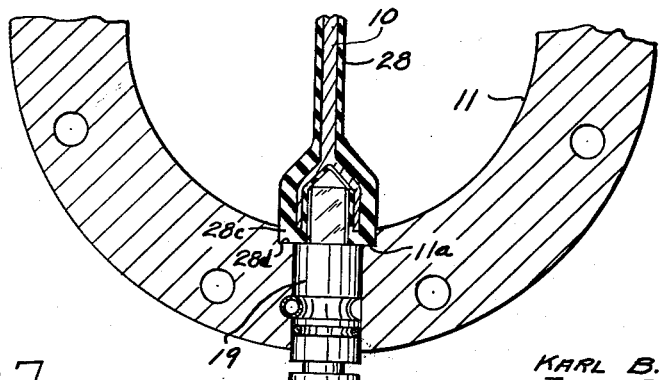
FIG. 7 is a view similar to FIG. 6 showing the valve disc in valve-open position.

One of the unique features of our valve is its ability to seal against endwise leakage along shafts 18 and 19 in any disc position whether fully open, fully closed, or any intermediate position. The resilient coating is so formed that a greater compressive "squeeze" is exerted in the dimension through the shaft sockets in the disc, by making this diametrical dimension oversize with respect to the balance of the disc. While this is definitely indicated in FIGS. 1 and 4 it is shown more positively in the somewhat enlarged illustrations of FIGS. 5, 6 and 7. The resilient coating 28b which covers the bosses 16 and 17 is extended outwardly at 28c to provide flattened end faces 28d (FIGS. 6 and 7). The cylindrical housing 11 has its inner peripheral wall undercut to provide transverse channels 11a (FIGS. 5, 6 and 7) into which projections 28c extend and seat in sealing relationship by reason of the mating planar contact of boss end faces 28d and channel bottom walls 11a, and the inherent squeeze resulting from the oversize dimension diametrically across the bosses. The resilient deformation of the bosses remains the same in all positions of the disc so as to very securely seal against endwise leakage along shafts 18 and 19.

Since the external diametrical dimensions of the circular portion of the coated disc are at all points larger than the inner diameter of the housing wall the coated periphery is compressed between the disc core and said inner wall when the disc is turned to closed position, thus effectively sealing flow through the conduit in said position, as well as continuing to seal against end flow along the shaft just as in open position.

Another advantageous feature may be mentioned. By referring to the illustrations it will be noted that the rigid metallic core disc 10 nowhere directly bears against the rigid metallic housing but actually "floats" in its rubber sheath. In the exemplification shown in detail in FIGS.

5, 6 and 7 the rubber coating extends inwardly and around the interior walls of the boss socket. Even if this were not so, a "floating" position could be assumed by the disc since the shaft contact is an endwise sliding one within the socket. The disc is therefore, in fact, self centering so as to achieve an even compressive force all around with no zones of less secure sealing as is the case in most prior art devices of this nature.

Figure 4:
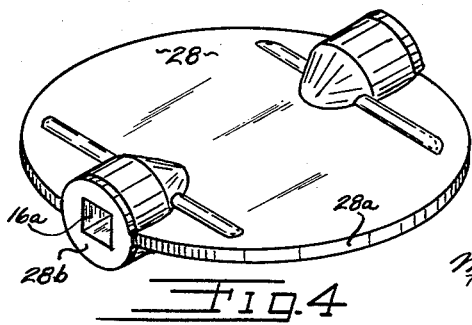
FIG. 4 is a perspective view of the valve disc disassembled from its fitting.

The method of assembling is obvious from what has already been said. Before fitting 11 is installed between pipe end flanges 13a and 14a the shafts 18 and 19 are removed to leave the disc as shown in FIG. 4. This disc is pushed into the fitting, the boss extensions sliding in channel 11a, against some resistance offered by the compressed resilient coating. The sockets 16a and 17a are aligned with the bored holes in fitting 11, and the shafts 18 and 19 are inserted, and retained by pins 21 and 27. The fitting is then secured between flanges 13a and 14a and the valve is ready for operation. Other means of fitting the valve in a pipe or conduit may be found more convenient, such as grooved or threaded connections.

The provision of fitting 11 is for convenience in assembly but the valve could be assembled in a section of pipe. The resilient coating on all exposed surfaces also serves to protect the metal disc from corrosive attack, and reduces wear under abrasive sludge conditions. The provision of shaft seals, packing glands, etc., is rendered unnecessary by the structure described. The valve is particularly useful when powdered material such as cement is being transmitted through a conduit under pressure, and has retained pressures up to 300 pounds per square inch with no leaks past the valve or endwise along the shafts.

The features described are unique and not found in other butterfly valves. They provide a valve with very few parts, requiring no shaft seals or stuffing boxes. The valve can be easily cleaned and its parts can be readily replaced.

What is claimed is:

1. A valve comprising a housing having an inner, substantially cylindrical, rigid wall surface; means defining a pair of diametrically oppositely disposed recesses in said cylindrical wall surface; a butterfly valve disc disposed within said housing and having a diametrical axis aligned with said recesses; said disc having a circular core which is diametrically slightly smaller than the diameter of said cylindrical wall surface; at least the peripheral edge portion of said core having a coating of resilient material bonded thereon; said coating being thick enough to extend the diameter of said disk beyond the diameter of said cylindrical wall surface and necessitating compression of said coating around the peripheral edge of said disc when said disc is rotated to a closed position whereby it is disposed in a plane which is transverse to the axis of said cylindrical wall surface; means on said disc providing journal means for journalling said disc in said housing at said recesses; said coating of resilient material being formed to provide integral projections which project radially outwardly beyond the periphery of said disc and completely surrounding said journal means and extending into said recesses at diametrically opposite positions on said disc, said projections resiliently compressively bearing against the bottoms of said recesses and tightly engaging the side walls of the recesses to provide a complete seal around said journal means and completing a seal across the interior of said housing transversely of the axis of said cylindrical wall surface when said disc is in a closed position.

2. A valve comprising a metal housing having an inner, substantially cylindrical wall surface defining a flow passage; means defining a pair of diametrically oppositely disposed, inwardly opening recesses in said cylindrical wall surface; each said recess having a flat bottom surface and side wall portions on either side of said recess in either direction of the circumference of said cylindrical wall surface; a butterfly valve disc disposed within said housing and having a diametrical axis aligned with said recesses; said disc having a metal, circular core which is diametrically slightly smaller than the diameter of said cylindrical wall surface; said core having means providing diametrically oppositely positioned sockets opening outwardly and disposed coaxially with said diametrical axis; said core encased in a coating of resilient material which is bonded thereto, said coating being thick enough to extend the diameter of said disc beyond the diameter of said cylindrical wall surface and necessitating compression of said coating around the peripheral edge of said disc when said disc is rotated to a closed position whereby it is disposed in a plane which is transverse to the axis of said cylindrical wall surface; journal means projecting inwardly from the flat bottom surfaces of said recesses and into said sockets for rotation of said disc about its diametrical axis; said coating of resilient material having portions extending radially outwardly from the extended diameter of said disc around said sockets and said journal means, the diametric distance across said radially extending portions being slightly in excess of the distance between the flat bottom portions of said recesses and causing said extending portions to be squeezed endwise into said recesses with portions thereof being squeezed laterally against said side wall portions of said recesses whereby, during rotation of said disc, said extending portions of said coating compressively resiliently bear against said bottom surfaces and said side wall portions of said recesses to effect a seal around said journal means and complete a seal across said flow passage transversely of the axis of said cylindrical wall surface.

3. A valve as set forth in claim 2; said housing being ring-shaped and having a substantially short axial dimension; said recesses being formed by providing flats in said cylindrical wall surface which extend completely through the axial dimension of said housing to facilitate mounting said disc within said housing from one axially directed end of said housing, said flats being formed radially outwardly to a depth at least equal to the periphery of said cylindrical wall surface.

References Cited by the Examiner

UNITED STATES PATENTS

| | | | |
|---|---|---|---|
| 2,488,380 | 11/49 | Danks | 251—173 |
| 3,072,139 | 1/63 | Mosites | 251—306 XR |
| 3,084,715 | 4/63 | Scharres | 251—173 XR |

ISADOR WEIL, *Primary Examiner.*

WILLIAM F. O'DEA, *Examiner.*